United States Patent [19]

Yamazaki et al.

[11] Patent Number: 4,792,738
[45] Date of Patent: Dec. 20, 1988

[54] MACHINE POSITION SENSING DEVICE

[75] Inventors: Etsuo Yamazaki; Hitoshi Matsuura, both of Hachioji, Japan

[73] Assignee: Fanuc Ltd, Minamitsuru, Japan

[21] Appl. No.: 912,520

[22] PCT Filed: Feb. 12, 1986

[86] PCT No.: PCT/JP86/00060
§ 371 Date: Sep. 11, 1986
§ 102(e) Date: Sep. 11, 1986

[87] PCT Pub. No.: WO86/05009
PCT Pub. Date: Aug. 28, 1986

[30] Foreign Application Priority Data

Feb. 13, 1985 [JP] Japan .................. 60-25694

[51] Int. Cl.$^4$ .............................................. G05B 7/02
[52] U.S. Cl. ................................................. 318/630
[58] Field of Search ............................... 318/630, 632

[56] References Cited

U.S. PATENT DOCUMENTS

| | | | |
|---|---|---|---|
| 3,766,461 | 10/1973 | Leenhouti | 318/630 |
| 3,828,238 | 8/1974 | Kobayashi et al. | 318/630 |
| 4,042,869 | 8/1977 | Eickelberg et al. | 318/630 |
| 4,251,761 | 2/1981 | Inoue | 318/630 |
| 4,502,108 | 2/1985 | Nozawa et al. | D18/630 X |
| 4,507,595 | 3/1985 | Rozsa | 318/630 |

FOREIGN PATENT DOCUMENTS 0076904 5/1983 Japan .................. 318/630

Primary Examiner—Bentsu Ro
Attorney, Agent, or Firm—Staas & Halsey

[57] ABSTRACT

The present invention is to permit accurate detection of the position of a movable machine part which is driven by a motor, through elimination of the influence of backlash.

A position sensor (3) creates position sensing pulses each time a movable machine part (2) which is driven by a motor (1) is moved by a predetermined amount. Counting means (4) counts the position sensing pulses from the position sensor (3) and readout means (5) reads out the count value of the counting means (4) at predetermined time intervals. Cancel means (6) cancels the contents of the counting means (4) by a value equal to the count value read out by the readout means (5). Backlash amount storage means (7) has prestored therein the amount of backlash in the drive system, amount-of-movement computing means (8) computes the actual amount of movement of the movable machine part (2) for each predetermined period of time on the basis of the stored contents of the backlash amount storage means (7) and the value read out by the readout means (5), and integrating means (9) integrates the results of computation by the amount-of-movement computing means (8).

1 Claim, 4 Drawing Sheets

MACHINE POSITION SENSING DEVICE

BACKGROUND OF THE INVENTION

The present invention relates to a machine position sensing device for sensing the position of a movable machine part in tracer control equipment or the like.

Tracer control equipment is theoretically capable of machining even without the recognition of the position of a movable machine part. In recent years, however, tracer control units have been equipped with a simple position control function and machine position sensing function so as to enable tracing return control and stop control without involving the use of a mechanical switch such as a limit switch or to permit positioning of the movable machine part when tracing is switched from one tracing area to another. These functions are performed through utilization of feedback pulses available from a position sensor associated with a motor directly or indirectly. Incidentally, the detected position of the movable machine part is utilized not only for tracer control but also it is displayed for monitoring the tracing operation by an operator.

In the prior art, the position of the movable machine part is sensed by counting feedback pulses from the position sensor through use of a counter, reading out the count value from the counter at predetermined time intervals, applying a sign-inverted version of the thus read-out count value to the counter to cancel its contents, and adding the above read-out count value to machine position data obtained so far.

When backlash is present in the drive system, however, the feedback pulses from the position sensor will be generated even if the movable machine part is not actually driven. Therefore, the machine position data obtained only by adding up the counter contents being read out does not accurately indicate the position of the movable machine part under the influence of the backlash. In addition, the machine position data frequently changes in response to driving within the backlash, posing the problem that the display of the data flickers and hence is very hard to see.

SUMMARY OF THE INVENTION

The present invention is intended to solve such a problem of the prior art and has for its object to ensure preventing the machine position data from being varied by driving within the backlash.

According to the present invention intended for solving the above defect of the prior art, as shown in FIG. 1, a device which detects the position of a movable machine part 2, which is driven by a motor 1, through use of pulses available from a position sensor 3 mounted directly or indirectly on the motor 1, is provided with counting means 4 for counting the pulses from the position sensor 3, read means 5 for reading the count value of the counting means 4 at predetermined time intervals, cancel means 6 for cancelling the contents of the counting means 4 by a value equal to the count value read out therefrom, backlash amount storage means 7 for storing the amount of backlash in the drive system, amount-of-movement computing means 8 for computing the actual amount of movement of the movable machine part at the predetermined time intervals on the basis of the count value read out by the read means 5 and the amount of backlash, and integrating means 9 for adding up the amount of movement computed by the amount-of-movement computing means 8.

The count value which is read out by the read means 5 contains a value corresponding to the actual movement of the movable machine part 2 and a value corresponding to backlash, but since the amount-of-movement computing means 8 computes the actual amount of movement of the movable machine part 2 on the basis of the preset amount of backlash, the count value corresponding to the backlash is neglected and the integrating means indicates the accurate position of the movable machine part, besides the machine position data will not change in response to driving within the backlash.

DESCRIPTION OF THE PREFERRED EMBODIMENTS

Figure 2:
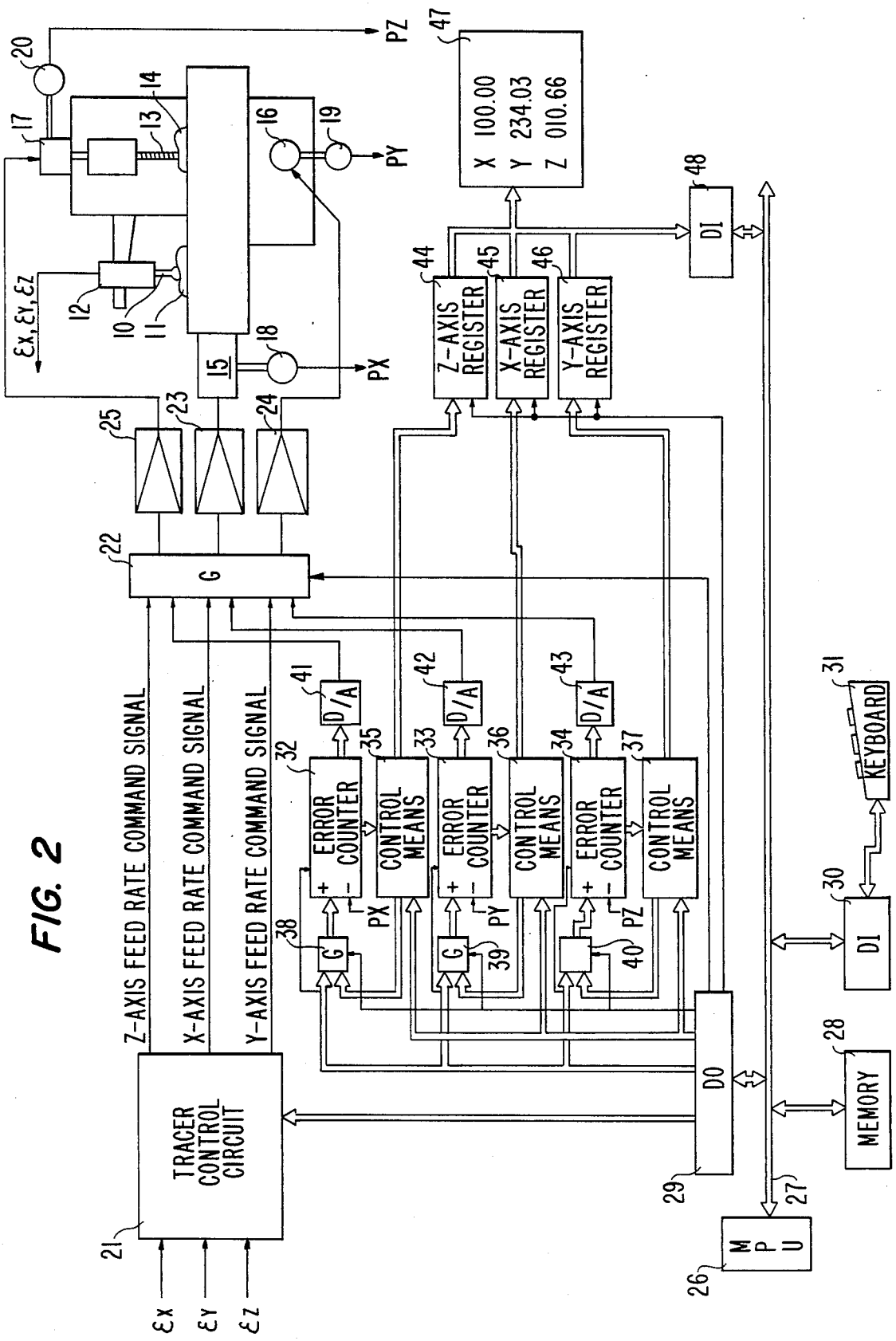
FIG. 2 is a block diagram illustrating the principal part of tracer control equipment embodying the present invention.

FIG. 2 illustrates in block form the principal part of tracer control equipment embodying the present invention. This tracer control equipment possesses a tracer control function, a positioning function, and a machine position detecting function.

In FIG. 2 a microcomputer 26 is connected to peripheral circuits through a bus 27 including a data bus, an address bus, and a control bus. A memory 28 has an area of storing programs for the microcomputer 28 to effect predetermined control and tracing definition data such as a reference displacement, a tracing feed rate, a tracing stroke limit, etc. and an area for storing target position data for positioning. An input circuit 30 is an interface of a keyboard 31, and various data can be stored in the memory 28 from the keyboard 31. An output circuit 29 provides tracing definition data to a tracer control circuit 21, move command values for respective axes via gate circuits 38 through 49 to error counters 32 to 34 and reset signals directly thereto, initialization signals and predetermined timing signals to control means 35 through 37, switching signals to gate circuits 38 through 40 and 22, and reset signals to Z-axis, X-axis and Y-axis registers 44, 45 and 46. An input circuit 48 is an interface through which the microcomputer 26 reads out the contents of the registers 44 through 46.

The tracer control circuit 21 creates, as is well-known in the art, tracing feed rate command signals in respective axes necessary for tracer control on the basis of displacement signals $\epsilon_x$, $\epsilon_y$, and $\epsilon_z$ which are derived from a tracer head 12 and the tracing definition data which is provided from the output circuit 29. The tracing feed rate command signals are applied via the gate circuit 22 to serve amplifiers 23 through 25 for the respective axes. X-axis, Y-axis and Z-axis motors 15, 16 and 17 which are driven by the outputs of the servo amplifiers 23 through 25 are to drive the tracer head 12 and a cutter 13 as one body through power transmission mechanisms such as gears, ball screws, etc. not shown. The tracer head 12 has a stylus 10 secured thereto for detecting the configuration of a model 11. Further, the motors 15 to 17 for the respective axes have attached thereto position sensors 17 to 19 such as pulse coders or the like, and pulses from the position sensors 17 to 19 are applied to the error counters 32 through 34.

The error counters 32 to 34 are caused by the outputs of the gate circuits 38 to 40 to count up and caused by the output pulses of the position sensors 17 to 19 to count down. The outputs of the error counters 32 to 34 are converted by D/A converters 41 to 43 into analog voltages, which are provided via the gate circuit 22 to the servo amplifiers 23 to 25. The control means 35 through 37 read out the contents of the error counters 32 to 34 at predetermined time intervals of, for instance, several milliseconds and, after inverting the signs of the thus read-out count values, apply them via the gate circuits 38 through 40 to the error counters 32 to 34 to thereby cancel their contents by the read-out values. At the same time, the control means obtain the amounts of movement of the position of a movable machine part (the center position of the stylus 10, for example) for each predetermined period of time on the basis of the read-out count values and backlash in respective axes described later and deliver the thus obtained amounts of movement to the registers 44 through 46. The registers 44 through 46 integrate or add up the amounts of movement input thereto and their contents are read out by the microcomputer 26 via the input circuit 26, as mentioned previously, and at the same time they are displayed on a CRT or like display device 47. Next, a description will be given of the operation of the tracer control equipment depicted in FIG. 2.

[Positioning Operation]

During positioning, the inputs of the gate circuits 38 through 40 are connected to the output circuit 29 and the inputs of the gate circuit 22 are connected to the D/A converters 41 through 43. For instance, in the case of shifting the movable machine part in the + directions along the X, Y and Z axes by distances corresponding to 100, 200 and 300 output pulses from the position sensors 18, 19 and 20, respectively, the microcomputer 26 sets values 300, 100 and 200 in the Z-axis, X-axis and Y-axis error counters 34, 33 and 32 via the output circuit 29 and the gate circuits 38 to 40. Since the gate circuit 22 is connected to the D/A converters, the analog voltages into which the contents of the respective error counters have been converted are input into the servo amplifiers of the respective axes and the motors are driven by the outputs of the servo amplifiers. As the motors rotate, the position sensors generate pulses of repetitive frequencies corresponding to the rotating speeds of the motors, by which the contents of the error counters 32 to 34 are counted down. When the contents of the error counters are reduced to zero, the motors are stopped from rotation, thus completing the positioning operation.

[Tracer Control Operation]

During tracer control, the inputs of the gate circuits 38 to 40 are connected to the control means 35 to 37 and the inputs of the gate circuit 22 are connected to the tracer control circuit 21. Further, the contents of the error counters 32 to 34 and the contents of the registers 44 to 46 are preset to zero at the origin of the coordinate system of the machine, initializing the control means 35 to 37. When brought into contact with the model 11, the stylus 10 is fed by the motors and the displacement signals $\epsilon_x$, $\epsilon_y$ and $\epsilon_z$ corresponding to the displacement of the stylus 10 are output from the tracer head 12. Based on the displacement signals and the tracing definition data from the output circuit 29, the tracer control circuit 21 creates Z-axis, Y-axis and X-axis feed rate command signals in a known manner. The feed rate command signals are provided via the gate circuit 22 to the servo amplifiers 23 to 25, the amplified outputs of which are applied to the motors of the respective axes to drive them, by which the cutter 13 and the stylus 10 are fed as one body, machining a workpiece 14 with the cutter 13.

[Machine Position Sensing Operation during Tracer Control]

When the motors 15 to 17 of the respective axes rotate during tracing, pulses corresponding to the amounts of rotation are generated by the position sensors 17 to 19 and the contents of the error counters 32 to 34 are counted up or down from zero in succession. The controlmeans 35 to 37 read the contents of the error counters 32 to 34 at predetermined time intervals, for example, every several milliseconds and, after inverting the signs of the read-out values, provide them via the gate circuits 38 to 40 to the error counters 32 to 34, cancelling their contents by the read-out values. Moreover, the control means obtain, from the read-out values and the amounts of backlash in the respective axes, the actual amounts of movement of the movable machine part in the respective axes for each predetermined period of time, compensated for backlash, and deliver them to the registers 44 to 46. By adding up the amounts of movement applied thereto, the registers 44 to 46 obtain the current positions of the movable machine part in the respective axes. The contents of the registers 44 to 46 are input into the display device 47, which displays on its screen the position of the movable machine part in each axis, as shown. Furthermore, the microcomputer 26 reads out the values of the registers 44 to 46 via the input circuit 48 and, by comparing the values with, for example, tracing stroke limit data prestored in the memory 28, checks whether the stylus 10 has reached the preset tracing stroke limit or not; if so, the microcomputer controls the tracer control circuit 21 to perform a pick feed.

Figure 1:
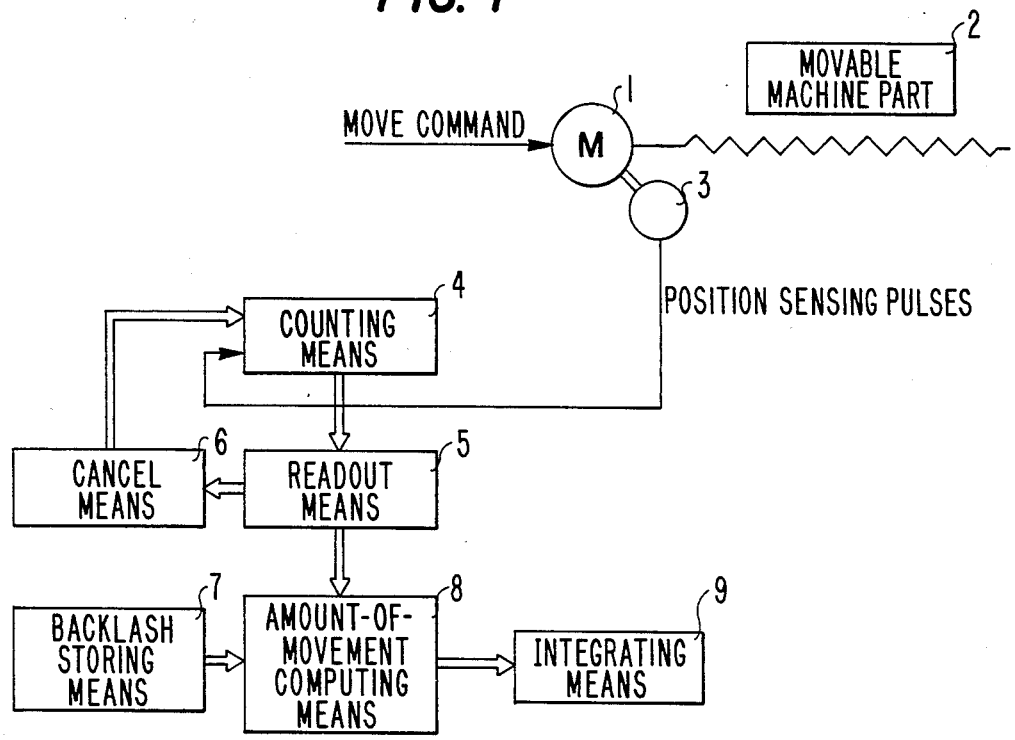
FIG. 1 is a diagram explanatory of the constitution of the present invention.
Figure 3:
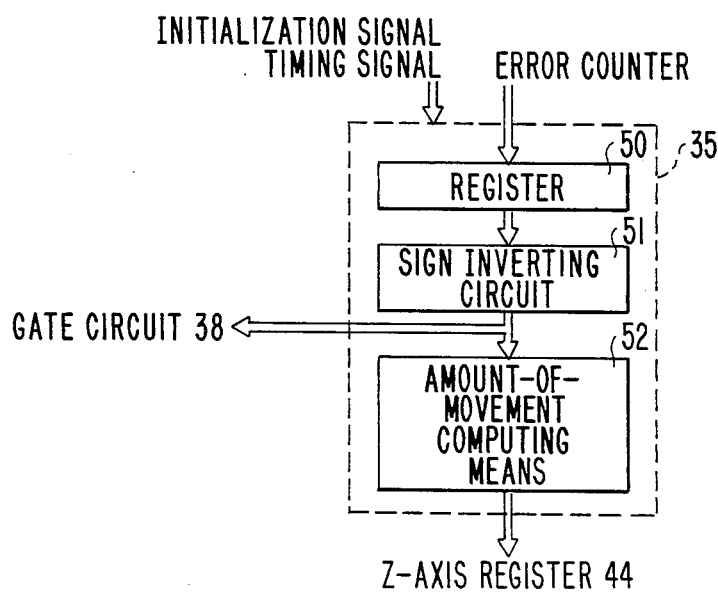
FIG. 3 is a block diagram showing the principal part of an example of control means 35.

FIG. 3 illustrates in block form the principal part of the control means 35. The other control means 36 and 37 can also be constructed similarly.

The control means 35 is supplied with the contents of the error counter 32 and an initialization signal and a timing signal from the output circuit 29. A register 50 reads out the contents of the error counter 32 at predetermined time intervals or every several milliseconds defined by the timing signal and a sign inverting circuit 51 inverts the sign of the read-out value and delivers it to the gate circuit 38 and amount-of-movement computing means 52. The actual amount of movement in the Z axis computed by the computing means 52 is provided to the Z-axis register 44.

Figure 4:
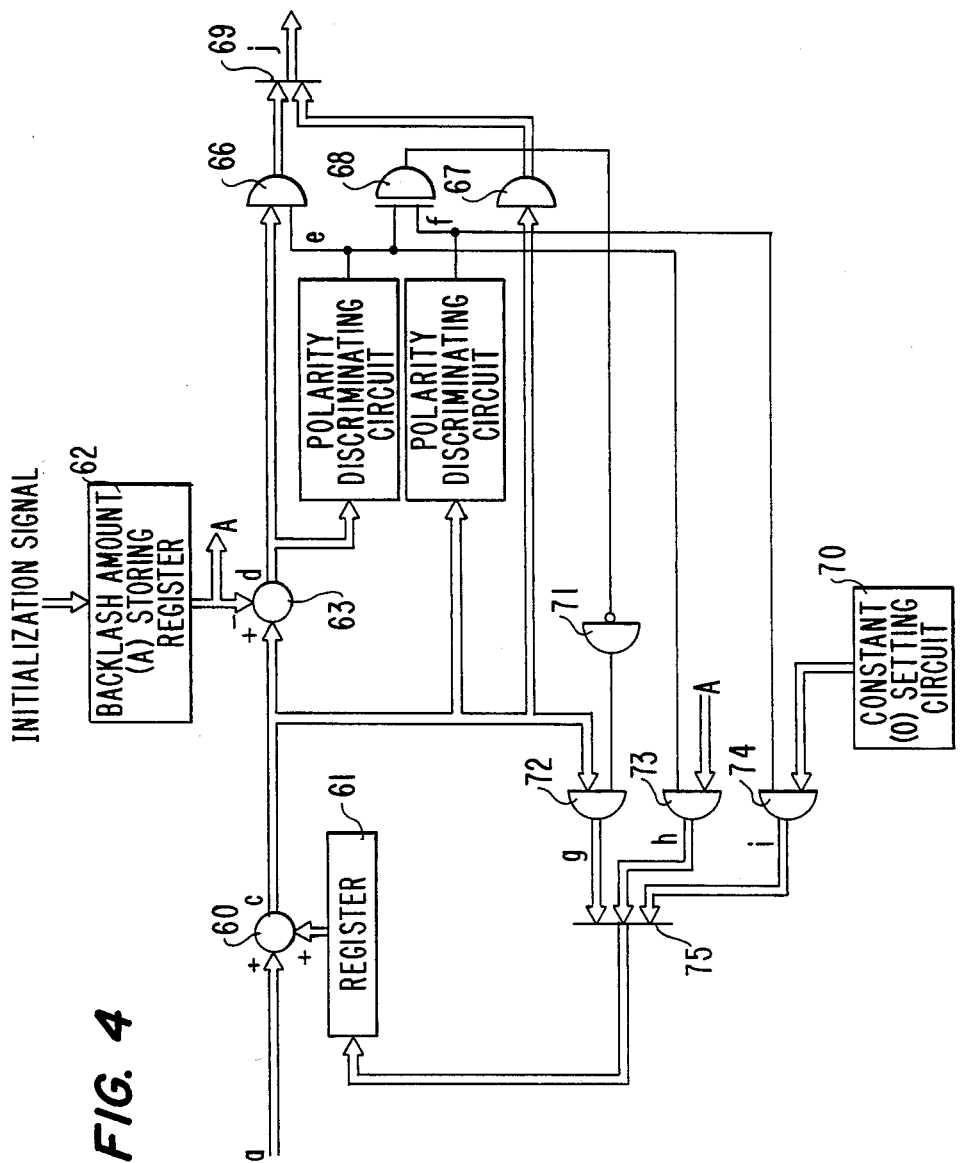
FIG. 4 is a block diagram showing the principal part of an example of amount-of-movement computing means 55.

FIG. 4 illustrates in block form the principal part of an example of the amount-of-movement computing means 52. The computing means of this example comprises a register 61 for storing a backlash discharge in the + direction along the Z axis, a register 62 for storing a backlash amount A in the Z axis, a subtractor 63 for subtracting the backlash amount A from the output c of an adder 60, a polarity discriminating circuit 64 which discriminates the polarity of the output d of the subtractor 63 and, when it is positive, provides an output "1", a polarity discriminating circuit 65 which discriminates the polarity of the output c of the adder 60 and, when it is negative, provides an output "1", a circuit composed of AND circuits 66 and 67 and an OR circuit 69, for determining whether the output c of the adder 60 or the output d of the subtractor 63 is delivered to the Z-axis register 44, on the basis of the contents of the output e of the polarity discriminating circuit 64 and the output f of the polarity discriminating circuit 65, and updating means for storing a new backlash discharge in the register 61 through utilization of the results of discrimination by the polarity discriminating circuits 64 and 65, the output c of the adder 60, the backlash amount A, and a preset value, i.e. a value of zero. The updating means comprises an exclusive OR circuit 68, AND circuits 72 to 74, an inverter 71, a setting circuit 70 for setting a constant (0), and an OR circuit 75.

Figure 5:
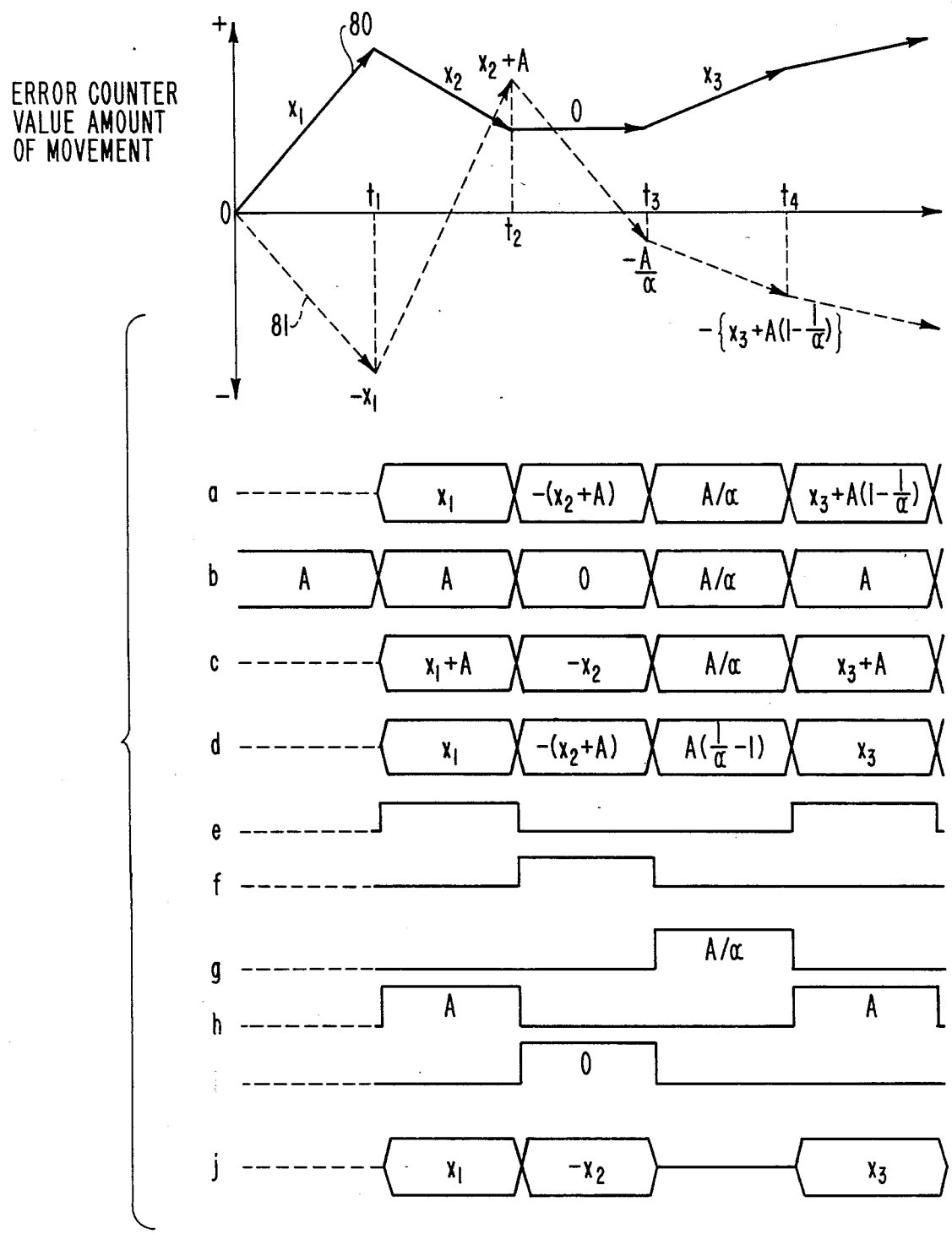
FIG. 5 is a timing chart showing the operation of the means depicted in FIG. 4.

FIG. 5 is a timing chart showing the operation of the amount-of-movement computing means depicted in FIG. 4. Reference numeral 80 indicates variations in the amount of movement of the movable machine part in the Z axis and 81 variations in the contents of the error counter 32. When the movable machine part lies at the origin in the Z axis with the backlash amount in its positive direction all discharged, the count value of the register 61 is A. Assuming that the actual position of the movable machine part in the Z axis has been shifted in the + direction by $x_1$ until a time $t_1$ as a result of tracing for a predetermined period of time, the count value of the error register 32 becomes $-x_1$. At the time $t_1$ the count value $-x_1$ of the error counter 32 is input into the register 50 and then inverted in sign by the sign inverting circuit 51 into a signal a of a value $x_1$, which is input into the amount-of-movement computing means 52. The value $x_1$ of this signal and the count value A of the register 61 are added together by the adder 60 and its added output c assumes a value $x_1+A$. Further, the value of the output d from the subtractor 63 which subtracts the backlash amount A from the value of the output c is $x_1$. Accordingly, since the output c of the adder 60 and the output d of the subtractor 63 are both positive, only the output e of the polarity discriminating circuit 64 goes to a "1" and the output d ($x_1$) of the subtractor 63 is provided as an output j to the Z-axis register 44 via the AND circuit 66 and the OR circuit 69. Moreover, by the "1" state of the output e, the AND circuit 73 is enabled and the backlash amount A is provided as a signal h to the register 61 via the OR circuit 75, retaining the count value of the register 61 at A.

Next, assuming that the movable machine part in the Z axis has been shifted in the − direction by $x_2$ until a time $t_2$, excess pulses corresponding to the backlash amount are generated by the position sensor 20 owing to the reversal of the direction of travel, with the result that the count value of the error counter 32 becomes larger than $x_2$ by A and the input a becomes $-(x_2+A)$. Accordingly, the output c of the adder 60 becomes $-x_2$ and the output d of the subtractor 63 becomes $-(x_2+A)$. Since the both outputs are negative, only the output f of the polarity discriminating circuit 65 goes to a "1", thus applying the output c of the adder 60, that is, $-x_2$ to the Z-axis register 44 via the AND circuit 67 and the OR circuit 69. By the "1" state of the output f of the polarity discriminating circuit 65, the constant (0) of the setting circuit 70 is set as a signal i in the register 61 via the AND circuit 74 and at that point of time it is stored that the backlash discharge in the + direction along the Z axis is zero.

Next, assuming that during the predetermined period of time from the time $t_2$ to $t_3$ the Z-axis motor 17 has rotated in the + direction by an amount smaller than the backlash amount, for instance, $A/\alpha$ (where $\alpha>1$), although the movable machine part in the Z axis has not actually changed, the count value of the error counter 32 at the time $t_3$ is $-A/\alpha$. in this instance, the output c of the adder 60 becomes $A/\alpha$, the output d of the subtractor 63 becomes $A\{(1/\alpha)-1\}$, and the outputs of the polarity discriminating circuits 64 and 65 both go to "0"s; so the AND circuits 66 and 67 remain closed, delivering no amount of travel to the Z-axis register 44. Since the output of the exclusive OR circuit 68 goes to a "0", the AND circuit 72 is enabled by the output of the inverter 71 and the output c ($A/\alpha$) of the adder 60 is set as a signal g in the register 61 via the OR circuit 75. That is, it is stored that the backlash amount in the + direction along the Z axis has been discharged by $A/\alpha$.

Thereafter, when the Z-axis motor has been further driven in the + direction during the period from the time $t_3$ to $t_4$ and the movable machine part has been moved by $x_3$ in the Z axis, the count value of the error counter 32 at the time $t_4$ is $-\{x_3+A(1-1/\alpha)\}$. In consequence, the output c of the adder 60 becomes $x_3+A$ and the output d of the subtractor 63 becomes $x_3$. Since the both outputs are positive, only the output e of the polarity discriminating circuit 64 goes to a "1" and the output d ($x_3$) of the subtractor 63 is provided to the Z-axis register 44 via the AND circuit 66 and the OR circuit 69. Further, since the backlash amount in the + direction along the Z axis has all been discharged by this movement, the AND circuit 73 is enabled and the backlash amount A is set in the register 61.

While the above embodiment of the machine position sensing device of the present invention has been described as being applied to tracer control equipment, the present invention is also applicable to other apparatus such as a numerical controller or the like.

As described above, according to the present invention, in a device for sensing the position of a movable machine part through use of feedback pulses from a position sensor mounted directly or indirectly on a motor, backlash compensation processing is performed so that the position of the movable machine part is not updated by feedback pulses which result from driving within the amount of backlash, so it is possible to obtain accurate machine position data which is in agreement with the actual position of the movable machine part. Moreover, since the position of the movable machine part, which is obtained by adding up the amounts of movement thereof, would not be varied by driving within the backlash, the display contents of the machine position will not frequently change and hence are easy to see.

We claim:

1. A device for sensing the position of a movable machine part, which is driven by a motor, through use of pulses available from a position sensor mounted on the motor directly or indirectly, said device comprising:
    counting means for counting the pulses from the position sensor;
    readout means for reading out the count value of the counting means at predetermined time intervals;

cancel means for cancelling the contents of the counting means by a value equal to the count value read out by the readout means;
backlash amount storage means for storing an amount of backlash;
amount-of-movement computing means for computing the actual amount of movement of the movable machine part for each said predetermined time interval on the basis of the count value read out by the readout means and the amount of backlash;
integrating means for integrating the amount of movement computed by the amount-of-movement computing means; and
wherein said amount-of-movement computing means comprising:
backlash discharge storage means for storing a backlash discharge value relative to the movement of the movable machine part in a predetermined direction;
backlash discharge adding means for adding the stored value of the backlash discharge storage means and the count value read out by the readout means;
subtracting means for subtracting the amount of backlash from the output value of the adding means;
first polarity discriminating means for discriminating the polarity of the output of the adding means;
second polarity discriminating means for discriminating the polarity of the output of the subtracting means;
amount-of-movement outputting means for outputting either one of the outputs of the adding means and the subtracting means to the integrating means in dependence upon the results of discrimination by the first and second polarity discriminating means; and
updating means for updating the stored value of the backlash discharge storage means on the basis of the results of discrimination by the first and second polarity discriminating means, the output of the adding means, the amount of backlash, and a present value.

* * * * *